Figure 3:
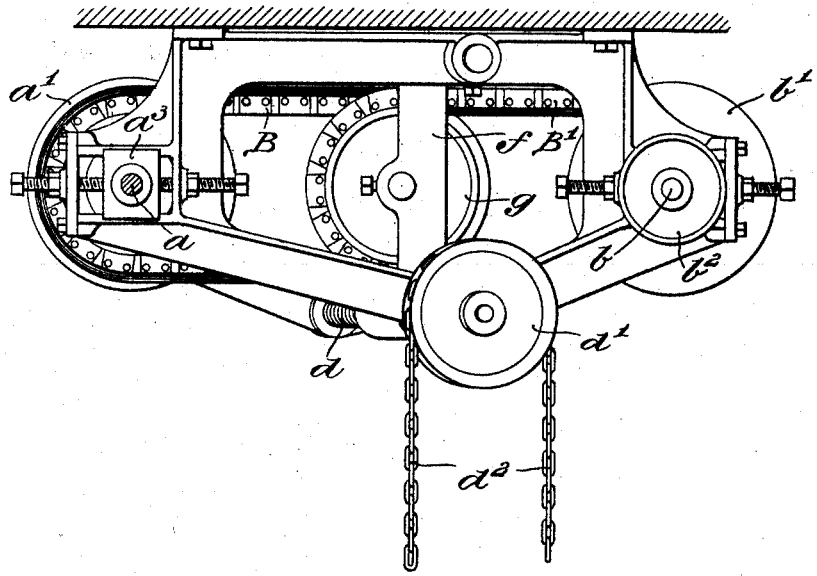

No. 759,872. PATENTED MAY 17, 1904.
W. EVANS & P. W. KNAUF.
VARIABLE SPEED TRANSMISSION DEVICE.
APPLICATION FILED OCT. 17, 1903.
NO MODEL. 4 SHEETS—SHEET 1.
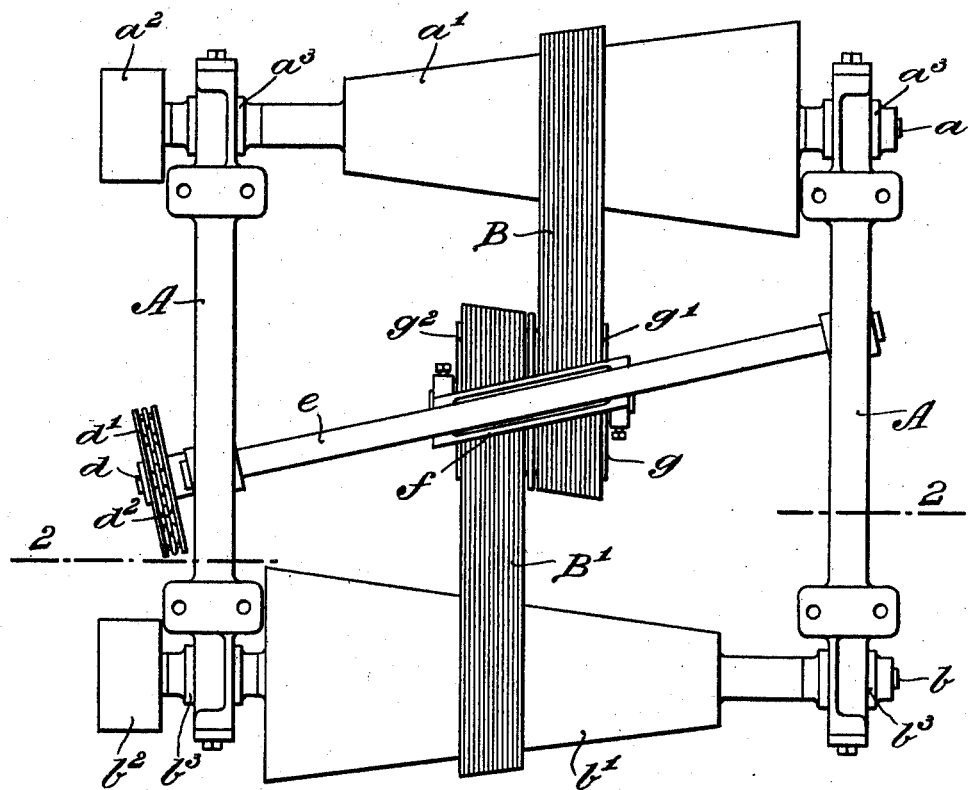
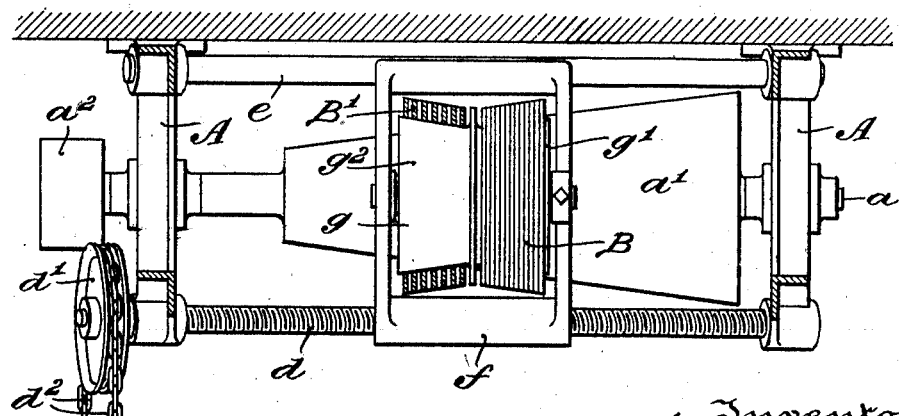

No. 759,872. PATENTED MAY 17, 1904.
W. EVANS & P. W. KNAUF.
VARIABLE SPEED TRANSMISSION DEVICE.
APPLICATION FILED OCT. 17, 1903.
NO MODEL. 4 SHEETS—SHEET 2.

Witnesses:
Jas. C. Wobensmith.
Wilhelm Vogt.

Inventors:
William Evans and Paul W. Knauf,
By J. Walter Douglass
Attorney

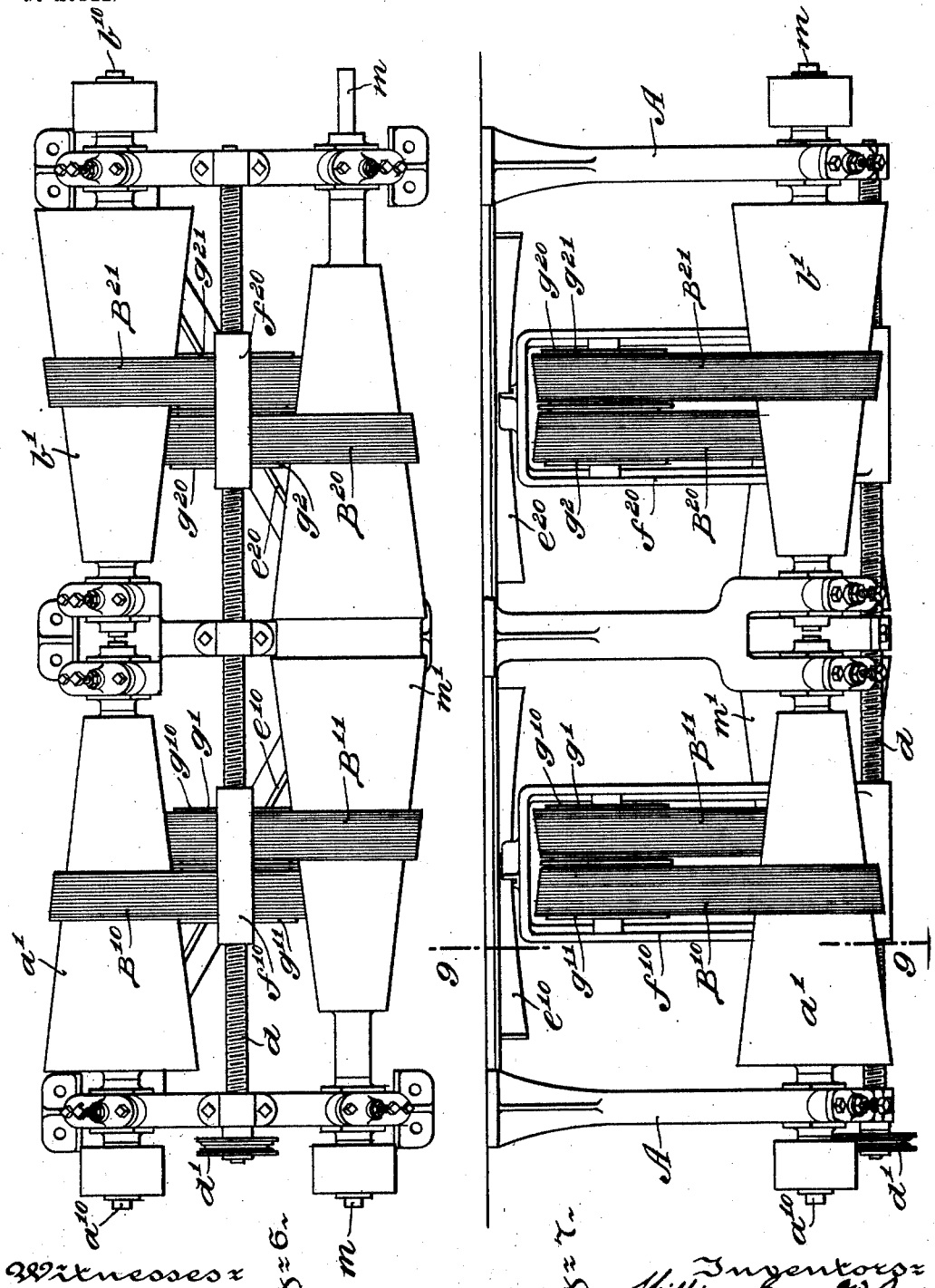

No. 759,872. PATENTED MAY 17, 1904.
W. EVANS & P. W. KNAUF.
VARIABLE SPEED TRANSMISSION DEVICE.
APPLICATION FILED OCT. 17, 1903.
NO MODEL. 4 SHEETS—SHEET 4.

No. 759,872. Patented May 17, 1904.

UNITED STATES PATENT OFFICE.

WILLIAM EVANS AND PAUL W. KNAUF, OF PHILADELPHIA, PENNSYLVANIA; SAID EVANS ASSIGNOR OF HIS RIGHT AND SAID KNAUF ASSIGNOR OF ONE-HALF OF HIS RIGHT TO SAID WILLIAM EVANS, JOHN H. EVANS, AND ROBERT EVANS, OF PHILADELPHIA, PENNSYLVANIA, TRADING AS JOHN EVANS' SONS.

VARIABLE-SPEED-TRANSMISSION DEVICE.

SPECIFICATION forming part of Letters Patent No. 759,872, dated May 17, 1904.

Application filed October 17, 1903. Serial No. 177,429. (No model.)

*To all whom it may concern:*

Be it known that we, WILLIAM EVANS and PAUL W. KNAUF, both citizens of the United States, residing at the city of Philadelphia, in the county of Philadelphia and State of Pennsylvania, have jointly invented certain new and useful Improvements in Variable-Speed-Transmission Devices, of which the following is a specification.

Our invention has relation to a device for the transmission of variable speed to a driven shaft from a driving-shaft, and in such connection it relates more particularly to the construction and arrangement of such a device.

The principal objects of our invention are, first, to provide in a device of the character described a power-shaft having a cone-pulley, a shaft to be driven at variable speeds, also having a cone-pulley reversely arranged with respect to the cone-pulley of the power-shaft, an idler-pulley having two opposed conical faces, a belt connecting one conical face of the idler-pulley with the cone of the power-shaft, a second belt connecting the second conical face of said idler-pulley with the cone of the shaft to be driven, and means for sliding the double-cone idler-pulley diagonally with respect to the axes of the driving and driven shafts to increase or decrease the speed of the driven shaft, and, second, to provide in combination with the power and driven shafts, each having cones oppositely arranged with respect to each other, the double-coned idler-pulleys and means for shifting the idlers diagonally with respect to the axis of each of the two shafts, a counter-shaft having opposed cones and belts connecting one cone of the counter-shaft with one cone of one idler, a second belt connecting the other cone of the counter-shaft with a cone of the second idler, and belts connecting the remaining cones of each idler with respectively the driving and driven shafts, whereby the range of variations in speed of the driven shaft may be augmented without increasing the inclination of the cones of the respective shafts.

The nature and scope of our invention will be more fully understood from the following description, taken in connection with the accompanying drawings, forming part hereof, in which—

Figure 4:
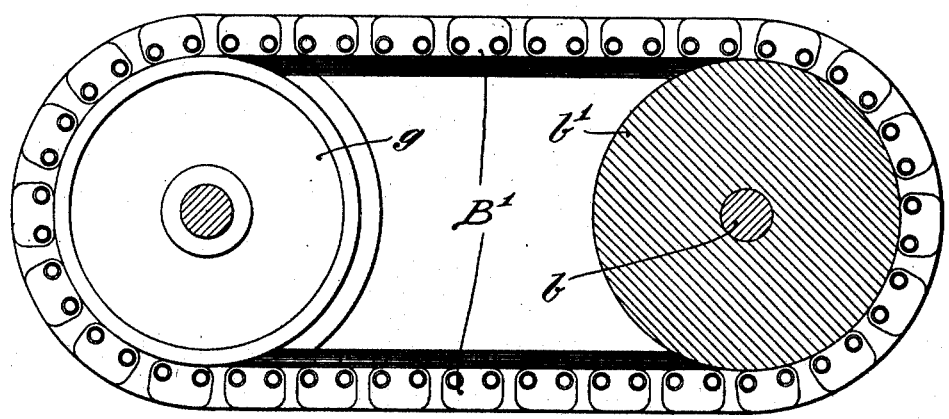
Figure 5:
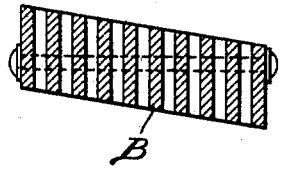
Figure 8:
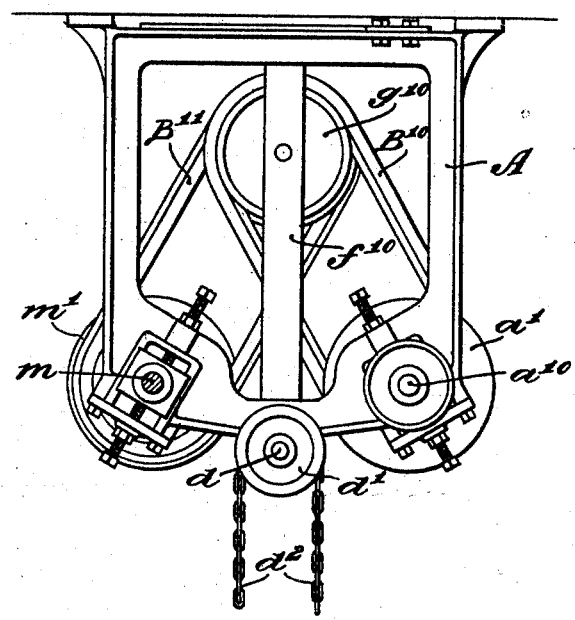
Figure 9:
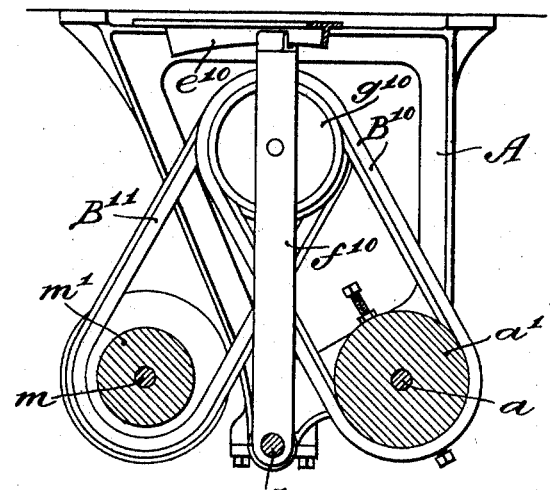

Figure 1 is a top or plan view of a variable-speed-transmission device embodying main features of our invention. Fig. 2 is a longitudinal sectional view taken on the line 2 2 of Fig. 1. Fig. 3 is an end elevational view of the device. Fig. 4 is an enlarged view, partly in side elevation and partly in section, of the double-coned idler-pulley, the coned pulley of the driving-shaft, and belt connecting the same. Fig. 5 is an enlarged cross-sectional view of one of the belts. Fig. 6 is an underneath plan view of a modified form of the invention in which a counter-shaft is employed. Fig. 7 is a side elevational view of Fig. 6. Fig. 8 is an end elevational view, partly sectioned, of Fig. 6; and Fig. 9 is a vertical sectional view taken on the line 9 9 of Fig. 7.

Referring to Figs. 1 to 5, inclusive, $a$ represents the driving-shaft, having end bearings in the framework A and provided intermediate of its ends with a cone-pulley $a'$. The shaft $a$ is also provided with a pulley $a^2$ to receive power from any source. (Not shown.) In the framework A is arranged the shaft $b$ to be driven. This shaft $b$ has a cone-pulley $b'$ oppositely arranged with respect to the cone-pulley $a'$ of the shaft $a$, and it is also provided with an ordinary pulley $b^2$ to transmit its power to the machine. (Not shown.) Intermediate of the two shafts $a$ and $b$ and diagonally disposed or inclined to the axes of said shafts is a screw-spindle $d$ and a bar or rod $e$. Threaded on the spidle $d$ is a box or frame $f$, in which is supported an idler-pulley $g$, having a double-coned surface $g'$ $g^2$, the two cones being arranged, respectively, opposite to each other, but in parallel relationship with the cones $a'$ and $b'$ of the shafts $a$ and $b$. The top of the box or frame $f$ is arranged to slide on the bar or rod $e$ as the base of said box $f$ travels back and forth on the spindle $d$. A sprocket-wheel $d'$ and chain $d^2$ serve as a means to rotate the spindle $d$ in either direction to advance or retract the box $f$ and pulley $g$ diagonally between the shafts $a$ and $b$. A belt B connects the cone $g'$ of the idler $g$ with the cone $a'$ of the driving-shaft $a$, and a similar belt B' connects the cone $g^2$ of the idler $g$ with the cone $b'$ of the driven shaft $b$. The preferred construction of belt B is illustrated somewhat in detail in Figs. 4 and 5; but inasmuch as such construction forms part of a companion application for a patent filed by us under date of October 17, A. D. 1903, and serially numbered 177,430, it is not necessary in this application to describe said construction.

In the operation of the simpler form of our device, (illustrated in Figs. 1 to 5, inclusive,) the operation of the sprocket-wheel $d'$ by the chain $d^2$ in one direction forces the frame $f$ and idler-pulley $g$ to travel, say, from right to left in Fig. 1. The belts B and B' travel with the pulley $g$, and hence the belt B will be advanced on the cone $a'$ toward the smaller end of said cone $a'$, whereas the belt B' will be advanced on its cone $b'$ toward the larger end of said cone $b'$. The diagonal movement of the pulley $g$ compensates for, respectively, the slack on the belt B and the increased tension on the belt B'. As a result of this movement of the two belts the idler-pulley is driven with less speed by the shaft $a$ and in turn drives the shaft $b$ with less speed. A very little movement of the frame $f$, pulley $g$, and belts B and B' in one direction serves, therefore, to materially decrease the speed of the driven shaft $b$, whereas a slight reverse movement of said frame $f$, pulley $g$, and belts B and B' serves to materially increase the speed of said driven shaft $b$.

If desired, both shafts $a$ and $b$ may be supported in the frame A in adjustable bearings $a^3$ and $b^3$, respectively, so that when occasion requires the give of the belts B and B' may be taken up by an adjustment of the shafts $a$ and $b$ transversely in the frame A.

In the form of our device illustrated in Figs. 6 to 9, inclusive, a counter-shaft $m$ is interposed between the driving-shaft $a^{10}$ and driven shaft $b^{10}$ to augment the variations in speed given to the driven shaft $b^{10}$ without increasing the pitch of the various coned pulleys. In this form of the device it is preferable to use two double-coned idler-pulleys $g^{10}$ and $g^{20}$ and to rearrange the shafts, their cones, and connecting-belts so that the construction, while compact, shall be simple and efficient. The shafts $a^{10}$ and $b^{10}$ are arranged end to end in alinement, with their cones $a'$ and $b'$ oppositely disposed, and upon the counter-shaft $m$ is arranged a double cone $m'$, reversely arranged with respect to the arrangement of the cones $a'$ and $b'$. Each double-coned idler-pulley $g^{10}$ and $g^{20}$ is carried in a separate box or frame $f^{10}$ and $f^{20}$, both screw-threaded, however, upon a single spindle $d$. The top of each frame or box $f^{10}$ or $f^{20}$ slides along a diagonally-disposed guide-bar $e^{10}$ or $e^{20}$, the bars $e^{10}$ and $e^{20}$ diverging from each other at a point midway between the cones $a'$ and $b'$ and adjacent to the counter-shaft $m$. When the spindle $d$ is rotated, the boxes $f^{10}$ and $f^{20}$ not only have a lateral movement but also an oscillating movement upon the spindle $d$ toward or away from the counter-shaft $m$ and, conversely, away from or toward the shafts $a^{10}$ and $b^{10}$. The idler-pulley $g^{10}$ is interposed between the driving-shaft $a^{10}$ and the counter-shaft $m$, connecting by two belts $B^{10}$ and $B^{11}$, respectively, the cone $a'$ with a cone $g'$ of the idler-pulley $g^{10}$ and a cone $g^{11}$ of said idler-pulley $g^{10}$ with one portion of the double cone $m'$ of said counter-shaft $m$. In a similar manner the belts $B^{20}$ and $B^{21}$ connect, respectively, the cone $b'$ of the shaft $b^{10}$ with the cone $g^2$ of the idler-pulley $g^{20}$ and a cone $g^{21}$ of said idler with the second portion of the double cone $m'$ of the counter-shaft $m$. In the form of our device illustrated in Figs. 6 to 9 the variation in speed transmission is augmented by the counter-shaft $m$, with its double cone $m'$. Thus if the belts $B^{10}$ and $B^{11}$ be shifted from left to right in Fig. 6 the driving-shaft $a^{10}$ transfers to the counter-shaft $m$ a reduced speed, and at the same time the shifting of the belts $B^{20}$ and $B^{21}$ still further reduces the speed of the driven shaft $b^{10}$, since the belt $B^{21}$ slides toward the smaller end of the cone of the shaft $m'$, while the belt $B^{20}$ slides up the cone $b'$ of the driven shaft $b^{10}$.

Having thus described the nature and objects of our invention, what we claim as new, and desire to secure by Letters Patent, is—

1. In a variable-speed-transmission device, a driving-shaft and a driven shaft, each provided with cone-pulleys oppositely arranged with respect to each other, an idler-pulley having a double-coned face, said double cones corresponding respectively with the cone-pulleys of the driving and driven shafts, a belt connecting the cone of the driving-shaft with a cone of the idler-pulley, and a belt connecting the other cone of the idler-pulley with the cone of the driven shaft, in combination with means for sliding the double-coned idler-pulley with its belts diagonally with respect to the axes of the two shafts.

2. In a variable-speed-transmission device, a driving and a driven shaft, each provided with a cone, the respective cones being oppositely arranged on the shafts, an idler-pulley arranged between the shafts and having two cone-surfaces corresponding respectively with the cone of each shaft, a belt connecting one cone-surface of the idler with the cone of the driving-shaft, a second belt connecting the other cone-surface of the idler with the cone of the driven shaft, a box or frame wherein the idler-pulley is supported, a guide-bar arranged diagonally with respect to the axes of the two shafts and arranged to guide the box or frame, and a screw-spindle threaded through the box or frame and adapted when turned to move said box or frame along the guide-bar.

3. In a variable-speed-transmission device, a driving and a driven shaft, each provided with a cone, the respective cones being oppositely arranged, a counter-shaft having a double-coned surface arranged adjacent to the driving and driven shafts, a double-coned idler-pulley arranged between the driving-shaft and counter-shaft, belts connecting the cones of the idler with respectively the cone of the driving-shaft and a cone of the counter-shaft, a second idler interposed between the driven shaft and counter-shaft and having a double-coned surface, belts connecting the cones of said second idler-shaft and the second cone of the counter-shaft, and means for shifting both idler-pulleys and both sets of belts diagonally with respect to the axes of the driving, driven and counter shafts.

In testimony whereof we have hereunto set our signatures in the presence of two subscribing witnesses.

WILLIAM EVANS.
PAUL W. KNAUF.

Witnesses:
J. WALTER DOUGLASS,
THOMAS M. SMITH.